April 30, 1957 — H. S. BREMBECK — 2,790,417
CONSTANT WATER LEVEL POULTRY FOUNTAIN
Filed Oct. 21, 1954
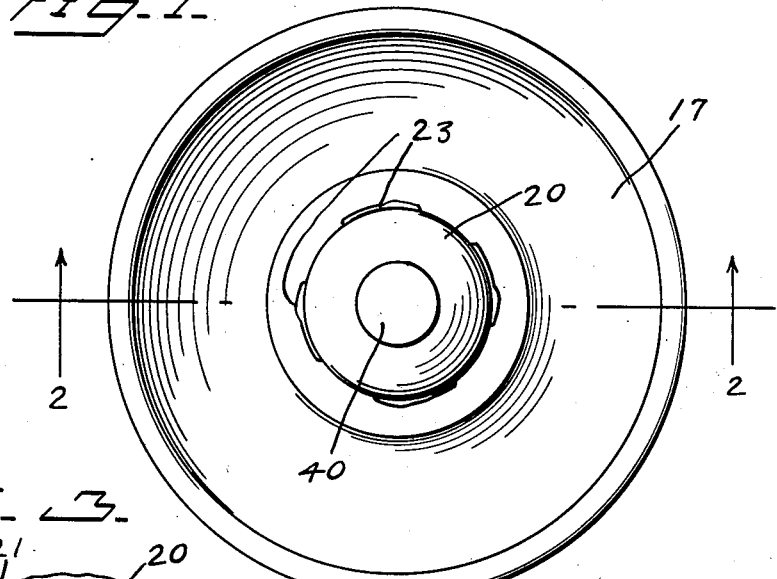
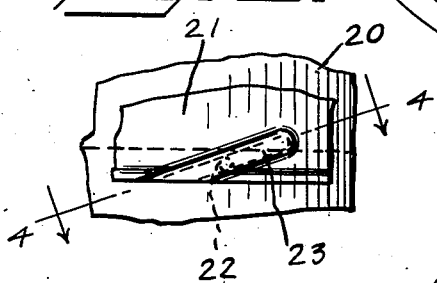
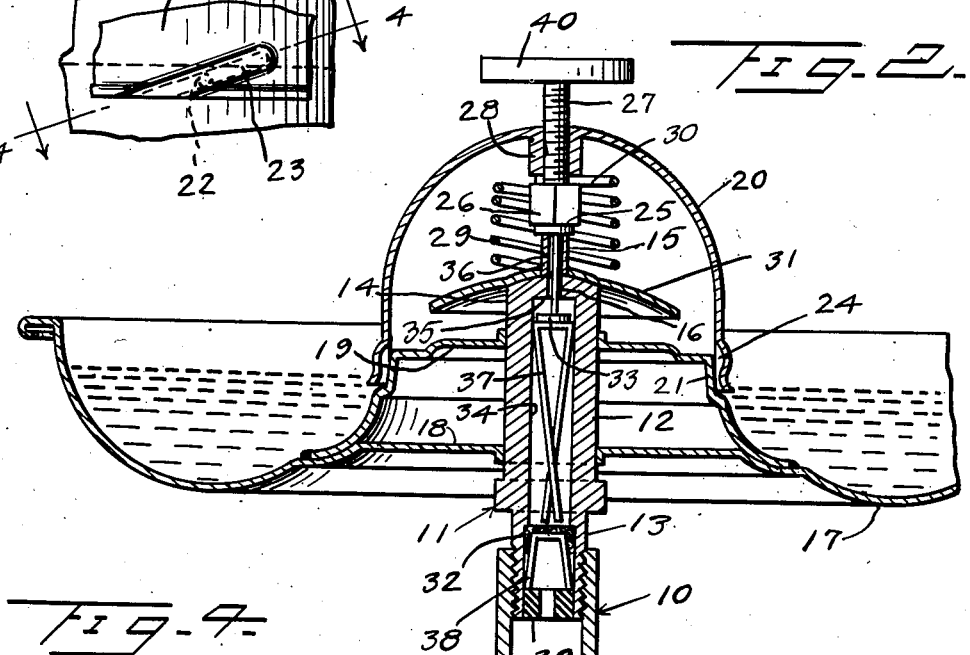
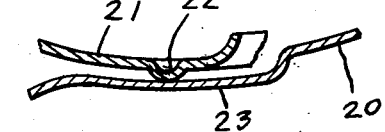
INVENTOR
H. S. Brembeck
BY Kimmel & Crowell
ATTORNEYS

United States Patent Office 2,790,417
Patented Apr. 30, 1957

2,790,417

CONSTANT WATER LEVEL POULTRY FOUNTAIN

Howard S. Brembeck, Milford, Ind.

Application October 21, 1954, Serial No. 463,719

4 Claims. (Cl. 119—81)

This invention relates to a poultry fountain, and more particularly to an automatically operable fountain for poultry whereby a predetermined supply of water is constantly maintained. This type of fountain embodies a receptable for containing water with a jet disposed centrally of the receptacle and connected to a source of water supply, the receptacle being provided with a cover or the like containing a valve confronting the jet and a spring yieldably supporting the cover and hence the receptacle.

A primary object of the invention is the provision of such a receptacle and cover releasably connected together, whereby upon removal of the cover ready access may be had to the valve and jet for cleaning, replacement, repairs or the like.

An additional important object of the invention is the provision of means interiorly of the cover comprising a water deflector to preclude seepage of water down the stem between the jet and the receptacle.

Still another important object of the invention is the provision of means controllable from the exterior of the cover whereby the position of the valve may be varied to vary the quantity of water emitted to the receptacle.

An additional object of the invention is the provision of such a poultry fountain which is sturdy and durable in construction, reliable and efficient in operation, readily accessible for repairs or cleaning and which is relatively simple and inexpensive to manufacture and assemble.

Still other objects reside in the combinations of elements, arrangements of parts, and features of contructions, all as will be more fully pointed out hereinafter and shown in the accompanying drawing wherein there is disclosed a preferred embodiment of this inventive concept.

In the drawing:

Figure 1 is a plan view of a poultry fountain constructed according to an embodiment of this invention.

Figure 2 is a fragmentary sectional view taken on the line 2—2 of Figure 1.

Figure 3 is an enlarged fragmentary side elevation of the receptacle and cap.

Figure 4 is a fragmentary sectional view taken on the line 4—4 of Figure 3.

Referring to the drawing, the numeral 10 designates generally a pipe adapted to be connected to a source of water supply under pressure.

A nozzle structure generally indicated at 11 is mounted on the upper end of the pipe 10 and includes a cylindrical housing 12 having a reduced externally threaded lower end 13 which is threaded into the pipe 10. The nozzle housing 12 is formed with an upper wall 14 and a tapered tip 15 extends from the wall 14.

The wall 14 is formed with a central opening 16 communicating with the tip 15.

A ring-shaped receptacle 17 is slidably disposed on the nozzle housing 12 and includes an inner pair of walls 18 and 19 having central openings within which the housing 12 slidably engages.

A dome-shaped cap 20 is removably mounted on an inner wall 21 which is formed integral with the upper wall 19, and wall 21 is formed with a pair of outwardly off-set detents 22 which are adapted to engage in a pair of obliquely disposed outwardly off-set channels 23 which are formed in the lower portion of cap 20.

In practice there are four of these channels 23 so that two of these channels will provide spaces 24 through which water discharged into the interior of cap 20 from the tip 15 will drain into the receptacle 17. From this it will be seen that the dome-shaped cap 20 may be readily removed from the receptacle 17 merely by giving the same a partial turn to disengage the detents 22 from the channels 23.

A valve washer or plug 25 confronts the upper end of the tip 15 and is carried by a head 26 in the form of a nut which is tightly disposed on the lower inner end of a threaded shank 27. The shank 27 is threaded through a nut 28 which is fixed on the inner side of the cap 20.

A spring 29 is disposed about the tip or nozzle 15 and has the upper end 30 thereof interposed between the nut 26 and the bushing 28. The lower end of the spring 29 bears against a dome-shaped deflector 31 which removably engages about the tip 15 and bears against the upper end of the nozzle member 11.

The spring 29 is adapted to yieldably urge the receptacle 17 upwardly and normally dispose the valve washer or plug 25 in open position.

A screen or strainer 32 is disposed in the lower end of the nozzle member 11, and a pressure-closing valve plug 33 is disposed in the bore 34 of the housing 12 and is adapted, when in closed position, to bear against the inner side or seat 35 formed in the top wall 14.

A stem 36 is fixed at its lower end to the valve member 33 and loosely projects upwardly through the tip 15. The valve member 33 is held against downward movement in the bore 34 by means of a retainer 37. The screen or strainer 32 is secured in the lower end of the nozzle member 11 by means of a U-shaped retainer 38, and an apertured rubber plug 39 is removably disposed in the lower end of the nozzle member 11.

In the use and operation of this fountain, the water in pipe 10 will flow upwardly into nozzle housing 12; and assuming that the receptacle 17 is empty or substantially empty, spring 29 will raise valve plug 25 upwardly to open position out of contact with the upper end of nozzle tip 15. The water will flow from tip 15 downwardly over deflector 31 and through the passages 24 into the ring-shaped receptacle 17.

After a predetermined quantity of water is in receptacle 17, the weight of this water will compress spring 29 so that valve plug 25 will be disposed in contacting position on the upper end of nozzle tip 15. The amount of water in receptacle 17 is regulated by turning knob 40 on the upper end of bolt 27.

If it is desired to remove the receptacle from the nozzle structure, the receptacle is merely lifted upwardly and at this time valve 33, which is under internal closing pressure, will be moved upwardly against seat 35 so that water will not be discharged from nozzle structure 11 when receptacle 17 is removed.

It is to be noted that the extreme simplicity with which the dome 20 may be removed from its associated receptacle 17, merely by disengagement of detents 22 and channels 23, results in a device which facilitates the cleaning of the receptacle and the replacement of any worn or damaged parts.

It is also to be noted that the deflector 31 substantially precludes any seepage of water down the sides of the cylindrical housing 12 between the walls 18 and 19 defining the central openings, thus eliminating wastage of water, as well as maintaining the ground beneath the receptacle in dry condition.

It will also be seen that the quantity of water contained in the receptacle may be readily varied merely by rotation of the knob 40, which varies the pressure exerted on the spring 30, and consequently determines the distance necessary for the respectacle to move to open the jet valve.

From the foregoing it will now be seen that there is herein provided an improved poultry fountain, which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

What is claimed is:

1. An automatic poultry fountain comprising a cylindrical housing adapted to be connected to a source of water supply under pressure, an upper end wall carried by said housing, said upper end wall having a central opening therein, a tapered tip extending upwardly from said end wall communicating with said central opening, a valve plug for closing the lower end of said central opening loose in said housing and disposed adjacent said end wall, a stem fixed to said valve plug loosely extending upwardly through said tip, a receptacle slidably mounted on said housing, a dome mounted on said receptacle overlying said tip, a valve adjustably mounted on said dome for engagement with the upper end of said tip, a spring constantly urging said dome and said second valve upwardly to open said tip, said stem normally engaging said second valve plug and holding said first valve plug in its open position, filling of said receptacle to a predetermined degree effecting contact of said second valve plug with said tip, said first valve plug upon removal of said receptacle from said housing moving upwardly to closed position against said end wall by water pressure in said housing.

2. An automatic poultry fountain comprising a receptacle having a pair of spaced walls centrally thereof with said walls having aligned openings, a cylindrical housing loosely extending through said openings, an upper end wall having a central opening integrally formed on said cylindrical housing, a tapered tip fixed relative to the upper end of said central opening, a valve plug confronting the upper end of said tip, means carried by said receptacle supporting said valve plug, a circular deflector carried by said cylindrical housing below said tip, a spring interposed between said deflector and said valve plug supporting means constantly urging said valve plug and said valve plug supporting means upwardly, and means vertically adjusting said plug to thereby vary the quantity of water to be discharged into said receptacle.

3. An automatic poultry fountain comprising a ring-shaped receptacle having an inner pair of vertically spaced walls, said walls having vertically aligned central openings formed therein, a cylindrical housing having a centrally apertured upper end wall formed thereon loosely extending through said openings, a centrally apertured deflector plate supported on said housing with its aperture coaxially aligned with the aperture in the upper end wall of said housing, a valve plug positioned above said housing for closing the aperture in the upper end wall thereof, a dome-shaped cap carried by said receptacle, a threaded shank fixed to said valve plug and engaging through said cap, a spring interposed between said cap and said deflector plate constantly urging said receptacle and said valve plug upwardly to open the aperture in the end wall in said housing, an internal pressure closing valve in said housing, a stem carried by said latter named valve projecting upwardly for engagement with said valve plug whereby the latter when in closed position will maintain said internal valve in open position, said dome encompassing said spring, said valve plug and said plate.

4. An automatic poultry fountain comprising a ring-shaped receptacle having an inner pair of vertically spaced walls, said walls having vertically aligned central openings formed therein, a cylindrical housing loosely extending through said openings, an upper end wall having a central opening extending therethrough integrally formed on said housing, a tapered tip communicating with the opening in said end wall and extending upwardly therefrom, a valve plug confronting the upper end of said tapered tip, a dome-shaped cap carried by said receptacle, a threaded shank fixed to said valve plug and engaging through said cap, a spring interposed between said cap and said cylindrical housing constantly urging said receptacle and valve plug upwardly to open said tapered tip, an internal pressure closing valve in said cylindrical housing, a stem carried by said latter named valve projecting upwardly for engagement with said valve plug whereby the latter when in closed position will maintain said internal valve in open position, means releasably securing said dome-shaped member to one of said inner walls of said receptacle, and channels communicating the interior of said dome with said receptacle.

References Cited in the file of this patent

FOREIGN PATENTS

| 1,160,511 | Imschweiler | Nov. 16, 1915 |
| 1,702,973 | Lord | Feb. 19, 1929 |
| 2,486,729 | Beckley | Nov. 1, 1949 |
| 2,541,622 | Toadvine | Feb. 13, 1951 |
| 2,651,321 | McBride | Sept. 8, 1953 |
| 2,716,423 | Landgraf | Aug. 30, 1955 |
| 2,737,967 | Johnson | Mar. 13, 1956 |